June 1, 1965  C. W. HIME  3,187,291

ELECTRICAL LOCKING PLUG

Filed Jan. 23, 1963  3 Sheets-Sheet 1

Charles Webster Hime
INVENTOR.

BY *Clarence A. O'Brien*
*and Harvey B. Jacobson*
Attorneys

June 1, 1965  C. W. HIME  3,187,291
ELECTRICAL LOCKING PLUG
Filed Jan. 23, 1963  3 Sheets-Sheet 2

Charles Webster Hime
INVENTOR.

BY *Clarence A. O'Brien*
*and Harvey B. Jacobson*
Attorneys

June 1, 1965 C. W. HIME 3,187,291
ELECTRICAL LOCKING PLUG
Filed Jan. 23, 1963
3 Sheets-Sheet 3

Charles Webster Hime
INVENTOR.

BY *Clarence A. O'Brien*
and *Harvey B. Jacobson*
Attorneys

3,187,291
ELECTRICAL LOCKING PLUG
Charles Webster Hime, 10 NE. 3rd Ave., Miami, Fla.
Filed Jan. 23, 1963, Ser. No. 255,714
8 Claims. (Cl. 339—74)

This application is a continuation-in-part of copending application Serial No. 851,447, filed November 6, 1959, for Electrical Locking Plug, now abandoned.

The present invention generally relates to electrical connectors and more particularly to a plug adapted to be securely locked in place in a conventional receptacle.

Briefly, the invention is embodied in an electrical locking plug including a body of insulating material from which a pair of prongs protrude. The prongs are adapted to be inserted into a conventional socket in a conventional manner. After insertion, movement of a locking device in relation to the body causes the prongs to interlock with the socket thereby preventing removal thereof with the locking device having to be manually moved to a retracted position in order for the prongs to be removed from the socket.

An object of the present invention is to provide a locking plug in accordance with the preceding paragraph in which movement of the locking device with reference to the body causes the prongs to be spread and wedged into the openings of the conventional receptacle.

A further object of the present invention is to provide an arrangement in which the prongs have a projection formed therein which projection is disposed on the outer surface thereof whereby the prongs will be spread outwardly or prevented from movement inwardly after they have been inserted into the socket by movement of the locking device thereby retaining the prongs in locking engagement with the body.

Therefore, one of the objects of the invention is to provide a locking plug which is capable of being very easily, but securely locked in place within a conventional receptacle.

A feature of the invention is found in the fact that the conventional receptacle remains unaltered. It is completely unnecessary to have special sockets or to change the conventional sockets in any way.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
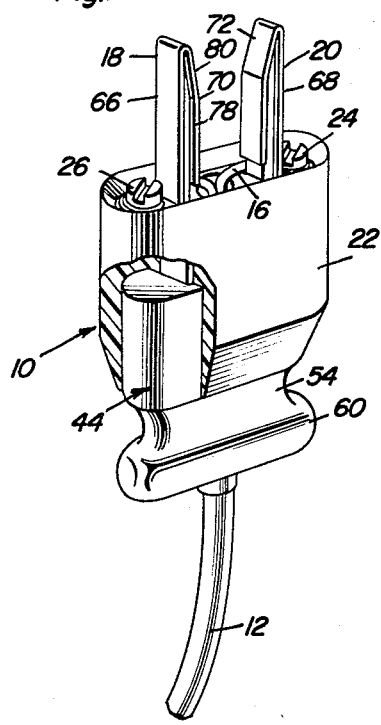
FIGURE 1 is a perspective view of a locking plug in accordance with the invention.

In FIGURES 1–4 of the accompanying drawings there is illustrated a locking plug 10 exemplifying the principles of the invention. The locking plug has an electrical conductor 12 connected with it, and the end of the conductor 12 (not shown) is securable operatively with any type of appliance, lamp, etc. Conductor 12 has its wires 14 and 16 operatively connected with two prongs 18 and 20 on one end of body 22 of plug 10. The connection between wires 14, 16 and prongs 18, 20 may be achieved in a number of ways, one of which is by solder connection and another of which is by using screws 24 and 26 which pass through apertures in lateral flanges 28 and 30 at the inner ends of the prongs and which are fitted in a recess 32 at one end of the body 22. The screws enter tapped openings formed in one end of body 22 thereby establishing the electrical connection and also anchoring the prongs 18 and 20 to body 22.

Figure 2:
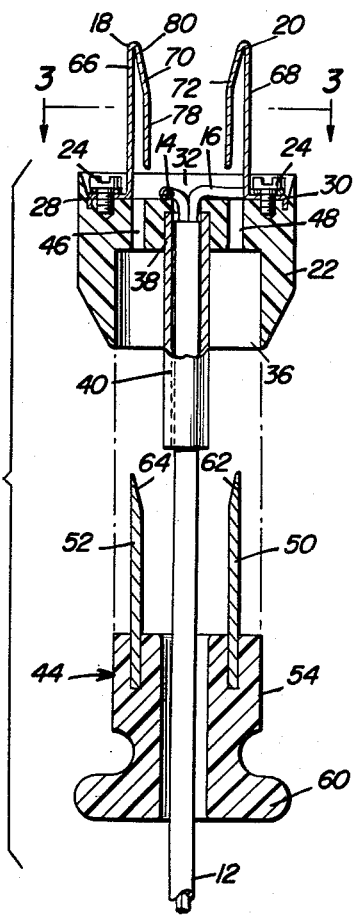
FIGURE 2 is an exploded sectional view of the locking plug.
Figure 4:
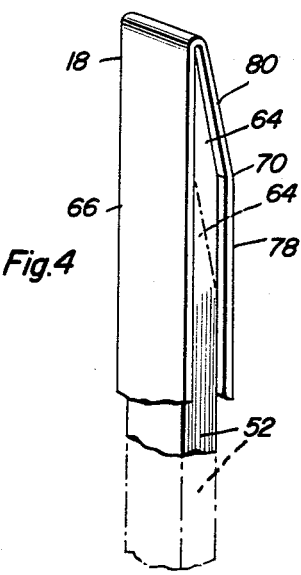
FIGURE 4 is a fragmentary perspective view of one of the prongs of the plug and showing the spreading action which takes place during operation of the plug.
Figure 3:
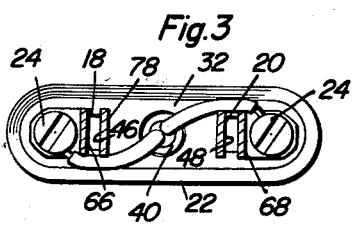
FIGURE 3 is a sectional view taken on the line 3—3 of FIGURE 2.
Figure 5:
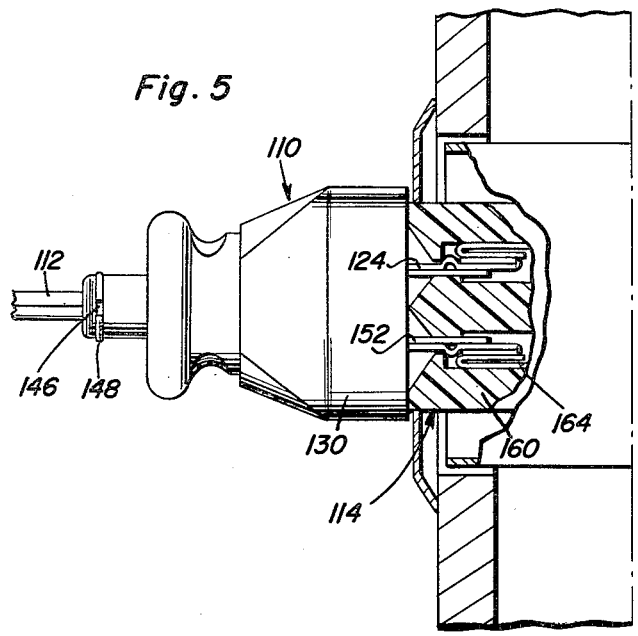
FIGURE 5 is a side elevational view of the locking plug with a portion of the socket being illustrated in section for showing the manner of interlocking connection between the plug and socket.
Figure 6:
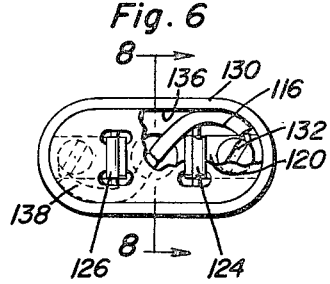
FIGURE 6 is an end view of the plug from the prong end thereof.
Figure 7:
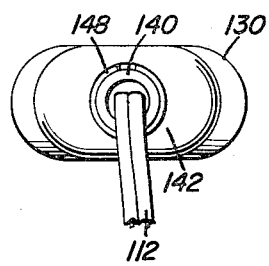
FIGURE 7 is an end view of the plug from the conductor end thereof.
Figure 8:
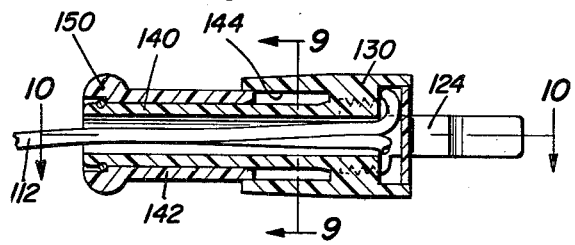
FIGURE 8 is a detail sectional view taken substantially upon a plane passing along section line 8—8 of FIGURE 6 illustrating the structural details of the plug.

Body 22 has a cavity 36 at the end thereof opposite to the end having prongs 18 and 20. Bore 38 in body 22 communicates recess 32 with cavity 36 and accommodates sleeve 40 which is fixed within the bore, for instance by being molded therewith. The sleeve forms a conduit for conductor 12 and functions as a guide for locking device 44 (FIGURE 2). Two passages 46 and 48 are in registry with recess 36 and open into cavity 36. The passages receive stems 50 and 52 that constitute part of locking device 44. The balance of the locking device is made of a plug member or plug body 54 having a cross-sectional shape to conform to the cross-sectional shape of cavity 36. A central bore extending axially through plug body 54, receives sleeve 40 as locking device 44 is mated with body 22. When locking device 44 is engaged with body 22, stems 50 and 52 pass partially through passages 46 and 48. A portion of plug body 54 occupies cavity 36, and the finger grip, for instance knob 60, at the outer end of plug body 54 remains on the exterior of the cavity at all times.

A very important feature of the invention is found in prongs 18 and 20 and also in the wedges 62 and 64 at the outer ends of stems 50 and 52. The prongs 18 and 20 are each made identical. In addition to flanges 28 and 30, the two prongs have sides 66 and 68 extending at right angles to the bottom of recess 32 or essentially so, and two walls 70 and 72 confronting each other and located between sides 66 and 68. Sides 70 and 72 are resilient, and each side includes a comparatively straight portion 78 and an angulated portion 80. The angulated portion 80 forms an acute angle with the plane of side 66, while the portion 78 is essentially parallel thereto. The acute angularity between portion 80 and side 66 forms a pocket within which the wedge 64 is received thereby causing prong 18 to spread and frictionally lock within an opening of a conventional socket.

In operation plug 10 is inserted in a conventional socket. More particularly, the locking device 44 is partially withdrawn from cavity 36, for instance about one-quarter of an inch as shown in one of the positions of FIGURE 4. The inherent elasticity and resilience of the sides of the prongs cause the prongs to be withdrawn or retracted thereby facilitating insertion of prongs 18 and 20 into the conventional socket. As soon as the socket prongs 18 and 20 are pushed all the way into the socket, locking device 44 is pushed forward with reference to body 22 thereby causing the ends of stems 50 and 52 to enter the pockets which have been previously defined as the space between the sides of the prongs. Although it is possible to have stems 50 and 52 blunt on the ends, the invention is more satisfactorily operative if wedges 62 and 64 are formed thereon. These cause the sides of the prongs 18 and 20 to spread and thereby exert a considerable frictional force on the contacts of the socket. This holds the socket and plug firmly united until removal of the plug.

Removal is achieved by first withdrawing the locking device 44 a short distance, for example about a quarter of an inch so that the sides of the prongs are relaxed and permitted to return to their normal position which is rather closely adjacent to each other. Only a very slight amount of movement between the sides of the prongs is necessary to cause the desired locking effect. Plugs often fit very snugly in reasonably good sockets. However, cheaper sockets sometimes accept plugs rather loosely, and worn sockets often do not tenaciously hold plugs therein. Plug 10 is so constructed that this difficulty is completely overcome.

Referring now specifically to FIGURES 5–12 of the official drawings, the numeral 110 generally designates the locking plug illustrated in these figures of the drawings which has the usual electrical conductor 112 connected thereto for supplying electrical energy to any suitable appliance, light or the like when the plug 110 is inserted into a conventional receptacle or socket generally designated by numeral 114.

Figure 11:
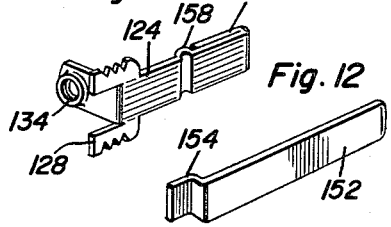
FIGURE 11 is a perspective view of one of the prongs.
Figure 12:
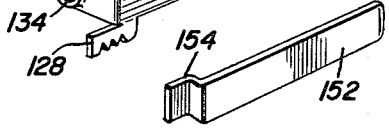
FIGURE 12 is a perspective view of a locking prong.
Figure 13:
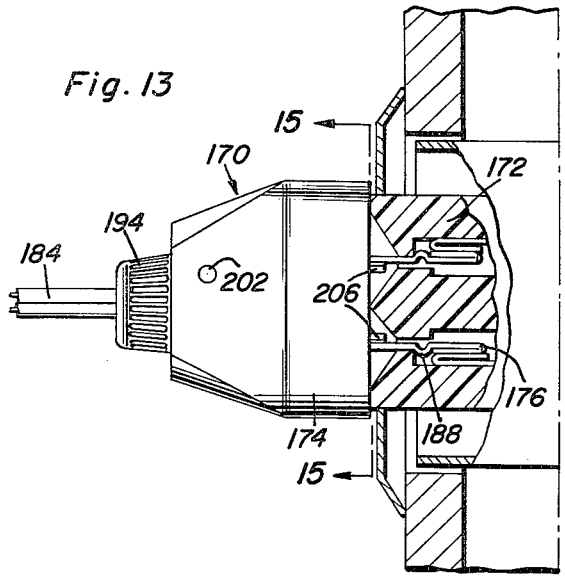
FIGURE 13 is a plan view of a modified form of locking plug.

The conductor 112 has two wires 116 and 118 connected with bases 120 and 122 of prongs 124 and 126 respectively. The prongs are substantially L-shaped as illustrated in FIGURE 11 with the bases extending perpendicular therefrom. Extending axially from the inner end of the prong 124 is a pair of tongues 128 embedded in the body 130 which forms a portion of the plug 110. The body 130 is of insulative material such as plastic or the like and the tongues 128 are provided on each of the prongs 124 and 126 for securely retaining the prongs mounted in the body 130. The ends of the conductors or wires 116 and 118 are secured to the bases 120 and 122 respectively by a screw-threaded member 132 extending through an internally threaded opening 134 formed on each of the base members 120 and 122 thereby electrically connecting the conductor 112 to the prongs 124 and 126. The bases 120 and 122 as well as the heads of the screws 132 are received in a recess 136 in the prong end of the body 130 and a cover of insulative material 138 is provided for the recess 136 to conceal the screws 132 and the ends of the wires 116 and 118.

Figure 9:
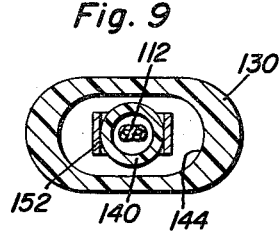
FIGURE 9 is a transverse, sectional view taken substantially upon a plane passing along section line 9—9 of FIGURE 8.

Formed integrally with the body 130 is a tubular sleeve or extension 140 which extends axially from the end thereof opposite from the end having the prongs. The sleeve 140 is preferably cylindrical in configuration and slidably receives a locking member 142. The bore of the locking member 142 is slidable on the sleeve 140. Also, the body 130 is provided with a recess 144 having a similar shape to the exterior of the locking member 142 for slidably receiving the locking member. Both the locking member 142 and the bore 144 are preferably oval-shaped as illustrated in FIGURE 9 thereby precluding relative rotation therebetween. Adjacent the outer end of the sleeve 140, there is provided a groove 146 having a split locking ring 148 thereon for retaining the locking member 142 in place. The outer end of the locking member is provided with a peripheral rib 150 defining a handle for manipulation of the locking member 142 in a reciprocating manner in relation to the sleeve 140 and the recess 144.

Figure 10:
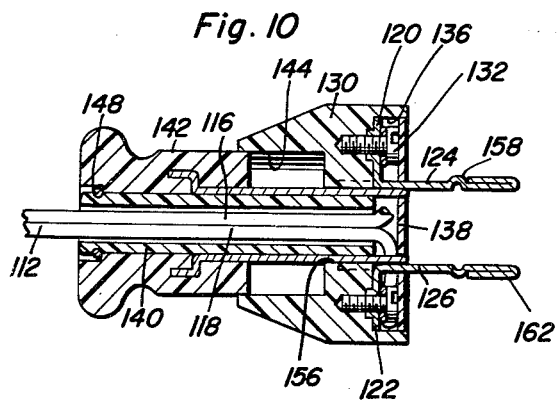
FIGURE 10 is a longitudinal, sectional view taken substantially upon a plane passing along section line 10—10 of FIGURE 8 illustrating further structural details of the plug.

Projecting axially from the inner end of the locking member 142 is a pair of locking prongs 152 having an offset angulated inner end portion 154 which is embedded in the plastic insulating material of the locking member 142 as illustrated in FIGURE 10. The locking prongs 152 extend alongside of the sleeve 140 and extend through apertures 156 in the body 130 and slide along the inner surface of the prongs 124 and 126 with the retracted position being illustrated in FIGURE 10 and the locking position being illustrated in FIGURE 5. When the locking prongs are inserted alongside of the prongs 124 and 126 and actually enter the socket 114, the prongs 124 and 126 cannot spring inwardly towards each other thereby becoming interlocked with the socket by virtue of each of the locking prongs 124 and 126 having an outwardly deformed rib 158 thereon which will interlockingly engage with the insulative body 160 of the socket thereby assuring positive contact of the reversely bent outer end portion 162 of each of the prongs 124 and 126 with the corresponding contact member 164 in the socket 114.

Operation of the device is generally the same as that described in conjunction with FIGURES 1–4 in that the plug with the locking member in retracted position is inserted into the socket in the conventional manner. The locking plug is then forced forwardly thereby moving the locking prongs 152 inwardly of the socket against the inner surface of the prongs 124 and 126 thereby preventing any inward deformation of the prongs 124 and 126 for retaining them lockingly engaged with the socket. For removal, it is only necessary to retract the locking member 142 thus retracting the locking prongs 152 and enabling the prongs 124 and 126 to spring inwardly towards each other for releasing the plug from the socket. The body 130 may be provided with tapering surfaces to provide adequate surface for insertion of the plug into the socket and, of course, the handle-forming rib 150 on the locking member will serve to not only retract the locking member but also retract the plug from the socket in an obvious manner.

FIGURES 13–19 illustrate another modified form of locking plug designated generally by reference numeral 170. The plug 170 is associated with a conventional socket 172 and includes a body 174 of insulation material such as plastic or the like with a pair of prongs 176 projecting therefrom in substantially the same manner as the prongs 124 in the device illustrated in FIGURES 5–12. The prongs 176 are secured to the body 174 by an L-shaped base 178 and inwardly extending prongs 180 which may be serrated on the side edges thereof substantially in the same nature as illustrated in FIGURE 11. A screw-threaded fastener 182 is provided through the base 178 of the prong 176 for securing an electrical conductor 184 to the prong. The prong 176 includes a reversely bent end portion 186 and an offset deformed portion 188 for coaction with the socket structure in the same manner as the device of FIGURES 5–12.

The center of the body 174 is provided with an axial bore 190 of cylindrical configuration rotatably receiving a locking member 192 which has a knurled knob 194 on the outer end thereof which is larger than the main body of the locking member 192 thus defining a shoulder 196 for rotational engagement with the outer end of the body 174. The locking member 192 is provided with a central passage 198 for receiving the conductors 184 which are secured to the prongs by virtue of the screw-threaded fasteners 182.

For rotatably retaining the cylindrical locking member 192 in position in the bore 190, the peripheral surface of the locking member 192 is provided with an arcuate groove 200 which receives a transverse pin 202 thus locking the locking member 192 rotatably in the bore 190 and enabling pivotal movement of the locking member 192 about its longitudinal axis.

Projecting from the end of the cylindrical locking member 192 is a pair of diametrically opposed locking prongs 204 having a radial cam 206 formed on the outer end thereof.

Figure 14:
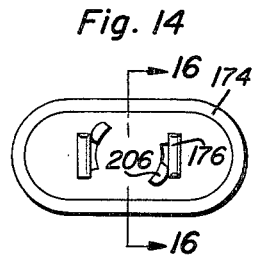
FIGURE 14 is an end view of the plug.
Figure 15:
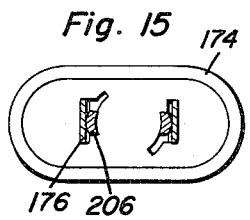
FIGURE 15 is an end view taken along reference line 15—15 of FIGURE 13.
Figure 16:
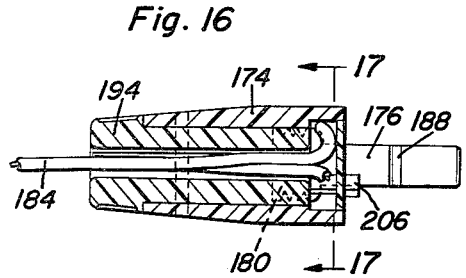
FIGURE 16 is a longitudinal sectional view taken along line 16—16 of FIGURE 14.
Figure 17:
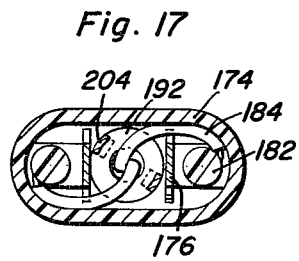
FIGURE 17 is a transverse sectional view taken along line 17—17 of FIGURE 16.
Figure 18:
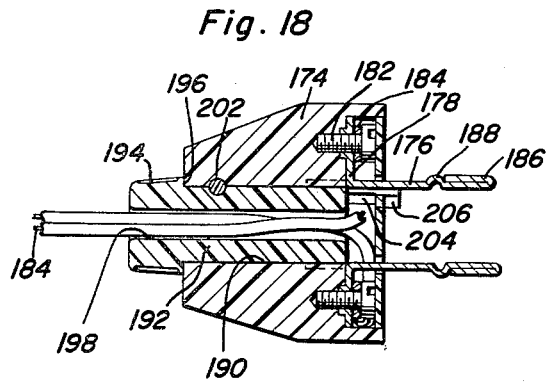
FIGURE 18 is a sectional plan view of the plug.
Figure 19:
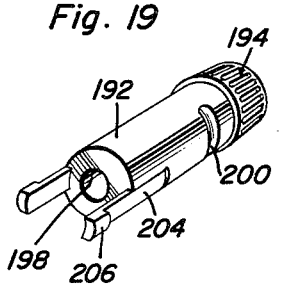
FIGURE 19 is a perspective view of the locking element.

The relationship of the radial cam to the inner surface of the prongs 176 is illustrated in FIGURES 14 and 15. In FIGURE 14, the radial cams are not in engagement with the prongs 176 insofar as any outward movement thereof is concerned. However, when the knob 194 is twisted thus rotating the locking member 192 about its longitudinal axis, the radial cams will move from a position above and below the prongs respectively as illustrated in FIGURE 14 into engagement with the inner surface of the prongs thereby spreading the prongs outwardly slightly and preventing the prongs from deflecting inwardly thereby locking the prongs 176 to the socket 172 in the manner illustrated in FIGURE 13 inasmuch as the offset portion 188 cannot then deflect inwardly in view of the relatively rigid nature of the prongs 176. The outward deflection of the prongs 176 not only assures locking engagement of the prongs with the socket but also assures electrical contact with the contacts within the socket.

In this form of the invention, the locking element is normally in an unlocked position during insertion of the prongs into the socket and also during removal thereof so that the locking element is normally unlocked when the plug is out of the socket. When the plug is inserted into the socket, the prongs 176 will enter in a normal manner. After the prongs have been engaged in the socket, the rotatable locking member will be rotated for engaging the radial cams 206 with the prongs 176 thereby deflecting the prongs outwardly for interlocking engagement with the socket body.

This construction provides for a rigid interlocking engagement between the plug and the socket effected by rotational movement of the locking member 192.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A plug for a conventional socket, said plug comprising a body having prongs, at least one of said prongs having a pair of sides joined together at their free ends spaced from said body and spreadable with respect to each other, and a locking device movable relative to said body and engageable between said sides to spread said sides when said prongs are inserted in the socket, an electrical cord having conductors directly and permanently connected to said prongs, said locking device including a stem having an end disposed between said sides of said prongs, a plug member to which said stem is secured, said body having a cavity accommodating said plug member, and said plug member being movably disposed in said cavity, a substantially rigid sleeve fixed to said body and extending through said cavity, said plug member having an axial passage, and said sleeve extending through said passage to form a guide for said plug and to function as a conduit and shield for said electric conductors secured to said prongs.

2. In combination, a plug for a conventional socket, said plug having a body provided with a cavity, a pair of resilient prongs secured to said body and spaced from each other, said body having passages in registry with said cavity, a locking device having a central aperture movably disposed in said cavity and having a pair of stems secured thereto which extend through said passages, each of said prongs having a first side and a second side integrally connected together, said second side having a portion essentially parallel to the first side and an additional portion at an angle to said first side and joined to said second side at its free end and said first side respectively to form a pocket therebetween, and said stems adapted to enter said pockets to resiliently spread said sides in response to movement of said locking device inwardly of said cavity, guide means connected between said locking device and said body to guide the movement of said locking device, said guide means including a sleeve fixed to said body and slidable in said aperture, and an electrical conductor having wires secured directly to said prongs and extended through said sleeve and aperture whereby said locking device is slidably retained on the wires when removed from said cavity and sleeve.

3. A plug for a conventional socket, said plug comprising a body having prongs, at least one of said prongs having a pair of resilient sides joined together and spreadable with respect to each other, one of said sides being straight and the other side having first and second straight portions integrally united, the first portion being integrally united at its end remote from said plug with the remote end of said other side and forming an acute angle therewith, the second portion extending toward said plug substantially parallel with said first portion, and a locking device movable relative to said body and engageable between said sides to spread said sides when said prongs are inserted in the socket, an electrical cord having conductors directly and permanently connected to said prongs, said locking device including a stem having a pointed end of the same shape as the space between said sides and disposed therebetween, a plug member to which said stem is secured, said body having a cavity accommodating said plug member, and said plug member being slidably disposed in said cavity.

4. A plug for locking engagement with a conventional socket comprising a body having a pair of generally parallel prongs projecting therefrom for reception in a socket, at least one of said prongs having a transverse rib projecting laterally therefrom in spaced relation to the free end thereof, a locking device movably mounted on said body, said locking device including a locking prong slidable alongside said one prong against the surface opposite to that having the rib projecting therefrom, said locking prong preventing lateral deflection of said one prong when extended towards the free end of said one prong for locking the plug to a socket and enabling lateral deflection of said one prong when retracted thereby enabling insertion and removal of the plug in relation to a socket, said body including a sleeve receiving electric wires connected to said prongs, said locking device including a handle slidable on the sleeve, said locking prong being attached to said handle and extending alongside the sleeve.

5. A locking plug for an electric socket comprising a body having a bore extending therethrough, a pair of contact prongs secured to said body and spaced from each other for insertion into a socket, a locking element rotatably mounted on said body and received in said bore, said locking element including a pair of axially extending prongs disposed alongeside the pair of contact prongs, each of said axially extending prongs including a radial cam on the end portion thereof for engagement with the inner surface of the contact prongs outwardly of the body for spreading the contact prongs outwardly and preventing lateral deflection thereof in a direction towards the radial cams thereby locking the contact prongs to the socket.

6. The structure as defined in claim 5 wherein each contact prong includes an offset portion for engagement with the socket, said locking element including a tubular sleeve receiving electric wires, a knob disposed exteriorly of the body on said sleeve for rotation of the locking element, and means rotatably securing the locking element to said body.

7. The structure as defined in claim 6 wherein said body includes arcuate openings therein enabling limited arcuate movement of the axially extending prongs and the radial cams thereon for rendering the radial cams movable to an operative and an inoperative position.

8. A locking plug for use in combination with a conventional electric socket comprising a body having a bore extending therethrough, a pair of contact prongs secured to said body and spaced from each other in substantially parallel relation for insertion into a conventional socket, a locking element rotatably disposed within said bore, means securing the locking element rotatably in the bore, said locking element projecting beyond the end of the body remote from the prongs and having a knob thereon whereby the locking element may be rotated, said locking element being in the form of a tubular sleeve having a longitudinal passage therethrough for receiving electric wires connected electrically to the contact prongs, said locking element including a pair of axially extending locking prongs at diametrically opposed points thereon projecting outwardly from the body alongside of the inner surface of the contact prongs, each locking prong including a radial cam on the outer end and on the outer surface for engaging the contact prongs outwardly of the body for spreading the contact prongs outwardly in relation to each other and preventing lateral inward deflection thereof for locking the contact prongs to the socket.

References Cited by the Examiner
UNITED STATES PATENTS

| | | | |
|---|---|---|---|
| 1,318,680 | 10/19 | McNeill. | |
| 1,909,648 | 5/33 | Austin | 339—74 X |
| 2,005,441 | 6/35 | Shearer | 339—74 X |
| 2,023,264 | 12/35 | Brucker | 339—196 X |
| 2,049,919 | 8/36 | McCain | 339—196 X |
| 2,130,424 | 9/38 | Grant | 339—195 |
| 2,210,625 | 8/40 | Kuhlman | 339—63 X |
| 2,261,615 | 11/41 | Cornwell | 339—74 |
| 2,274,798 | 3/42 | Kostal | 339—74 |
| 2,292,053 | 8/42 | Chirelstein | 339—195 |
| 2,434,154 | 1/48 | Gurin | 339—196 |
| 2,436,586 | 2/48 | Mangold | 339—196 |
| 2,476,510 | 7/49 | Rosner | 339—74 |
| 2,491,586 | 12/49 | Schott | 339—170 |
| 2,551,382 | 5/51 | Lindsay | 339—45 |
| 2,750,570 | 6/56 | Bates | 339—74 |
| 2,934,590 | 4/60 | Thompson et al. | 339—91 X |

JOSEPH D. SEERS, *Primary Examiner.*